US012738090B2

(12) United States Patent
Liu et al.

(10) Patent No.: US 12,738,090 B2
(45) Date of Patent: *Sep. 15, 2026

(54) DISPLAY PANEL AND DISPLAY DEVICE

(71) Applicant: Wuhan China Star Optoelectronics Technology Co., Ltd., Wuhan (CN)

(72) Inventors: Guangkun Liu, Wuhan (CN); Xiaowei Ye, Wuhan (CN); Zhou Zhang, Wuhan (CN); Guowei Zha, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,362

(22) Filed: Jan. 27, 2025

(65) Prior Publication Data

US 2025/0174039 A1 May 29, 2025

Related U.S. Application Data

(63) Continuation of application No. 17/289,920, filed as application No. PCT/CN2021/087841 on Apr. 16, 2021, now Pat. No. 12,243,344.

(30) Foreign Application Priority Data

Mar. 30, 2021 (CN) ......................... 202110340845.5

(51) Int. Cl.
*G06V 40/13* (2022.01)
*G06V 10/141* (2022.01)

(52) U.S. Cl.
CPC ........ *G06V 40/1318* (2022.01); *G06V 10/141* (2022.01)

(58) Field of Classification Search
None
See application file for complete search history.

(56) References Cited

U.S. PATENT DOCUMENTS

| | | | |
|---|---|---|---|
| 10,956,702 | B2 | 3/2021 | Wang et al. |
| 11,455,823 | B2 | 9/2022 | Zhang et al. |

(Continued)

FOREIGN PATENT DOCUMENTS

| | | |
|---|---|---|
| CN | 206058224 | 3/2017 |
| CN | 109284708 | 1/2019 |

(Continued)

OTHER PUBLICATIONS

International Search Report and the Written Opinion Dated Dec. 21, 2021 From the International Searching Authority Re. Application No. PCT/CN2021/087841 and Its Translation Into English. (15 Pages).

(Continued)

*Primary Examiner* — Joseph R Haley

(57) ABSTRACT

A display panel and a display device are provided. The display panel includes a light-guiding component, a signal transmitter, and a sensor array. The signal transmitter is disposed on at least one edge of a first surface of the light-guiding component. A light-emitting surface of the signal transmitter is provided with a light-controlling component. The light-controlling component is configured to adjust a light-emitting angle of the signal transmitter, so that the modulated light emitted from the signal transmitter has a total reflection in the light-guiding component. The display panel further includes a middle frame and an ink layer. The ink layer is disposed between a side of the middle frame facing the light-guiding component and a second surface of the light-guiding component. The second surface is inclined to the first surface.

20 Claims, 5 Drawing Sheets

(56) References Cited

U.S. PATENT DOCUMENTS

| | | | |
|---|---|---|---|
| 2004/0252867 | A1 | 12/2004 | Lan et al. |
| 2010/0053118 | A1 | 3/2010 | Chen |
| 2017/0185234 | A1 | 6/2017 | Zhang |
| 2017/0351901 | A1* | 12/2017 | Kim .................. G06V 40/1365 |
| 2018/0144174 | A1 | 5/2018 | Tzu et al. |
| 2019/0295456 | A1 | 9/2019 | Ling et al. |
| 2020/0057899 | A1 | 2/2020 | Chung et al. |
| 2020/0210669 | A1 | 7/2020 | Lee et al. |
| 2021/0124199 | A1 | 4/2021 | Qing et al. |
| 2021/0157198 | A1* | 5/2021 | Hu ........................ G06F 1/1658 |
| 2022/0004731 | A1 | 1/2022 | Li et al. |
| 2022/0320170 | A1 | 10/2022 | Hai et al. |
| 2022/0343671 | A1 | 10/2022 | Michalsky et al. |
| 2024/0135741 | A1 | 4/2024 | Liu et al. |

FOREIGN PATENT DOCUMENTS

| | | |
|---|---|---|
| CN | 110088768 | 8/2019 |
| CN | 209560566 | 10/2019 |
| CN | 110647699 | 1/2020 |
| CN | 111066028 | 4/2020 |
| CN | 210295114 | 4/2020 |
| CN | 111095283 | 5/2020 |
| CN | 211319241 | 8/2020 |
| CN | 112099259 | 12/2020 |
| CN | 112307843 | 2/2021 |

OTHER PUBLICATIONS

Notification of Office Action and Search Report Dated Sep. 5, 2022 From The State Intellectual Property Office of the People's Republic of China Re. Application No. 202110340845.5 and Its Translation Into English. (32 Pages).

Notification of Office Action and Search Report Dated Mar. 22, 2022 From The State Intellectual Property Office of the People's Republic of China Re. Application No. 202110340845.5 and Its Translation Into English. (21 Pages).

Notification of Office Action Dated May 4, 2023 From The State Intellectual Property Office of the People's Republic of China Re. Application No. 202110340845.5 and Its Translation Into English. (28 Pages).

* cited by examiner

DISPLAY PANEL AND DISPLAY DEVICE

CROSS-REFERENCE TO RELATED APPLICATIONS

This application is a continuation application of U.S. patent application Ser. No. 17/289,920, filed on Apr. 29, 2021, which is a US national phase application based upon an International Application No. PCT/CN2021/087841, filed on Apr. 16, 2021, which claims priority to Chinese Patent Application No. 202110340845.5, filed on Mar. 30, 2021. The disclosures of the aforementioned applications are incorporated herein by reference in their entireties.

TECHNICAL FIELD

The present disclosure relates to the technical field of display, and particularly to a display panel and a display device.

BACKGROUND

With development of display technologies, electronic display devices, such as cell phones and tablets, have already become social media and information storage carriers which are indispensable in people's lives. For these products, users not only pursue fashionable appearance features such as portability, full-screen panel, and thin and light body, but also pay great attention to protection of personal privacy. As a technology applied to identity recognition of electronic display devices, fingerprint recognition has been widely used and has a corresponding law effect. Currently, mainstream fingerprint recognition technologies include capacitive fingerprint recognition and optical fingerprint recognition. The capacitive fingerprint recognition is basically used in liquid crystal display (LCD) devices, and a fingerprint recognition region is usually positioned on a backside, a bottom border, or a lateral side of the display devices. The optical fingerprint recognition is basically used in organic light-emitting diode (OLED) display devices, and a fingerprint recognition area may be positioned in a display area, allowing the devices to have a good appearance. Nowadays, in the organic fingerprint recognition that is usually used, a fingerprint recognition module is positioned in a display area, thereby simplifying assembling processes of devices and realizing a full-screen panel. However, the above-mentioned fingerprint recognition methods can only recognize a single point of a fingerprint. That is, fingerprint recognition is limited to a certain and small region, resulting in a lack of convenience during operation.

Therefore, conventional display devices have a following issue to be solved: under-display fingerprint cognition is difficult to be applied to a large area.

SUMMARY

The present disclosure provides a display panel and a display device to solve a following issue: in conventional display devices, under-display fingerprint recognition is difficult to be applied to a large area.

To solve the above issue, technical solutions provided by the present disclosure are described below.

In a first aspect, a display panel is provided by the embodiments of the present disclosure. The display panel includes a light-guiding component, a signal transmitter, and a sensor array. The signal transmitter is disposed on at least one edge of a first surface of the light-guiding component. A predetermined included angle is defined between the signal transmitter and the first surface of the light-guiding component. The sensor array is disposed on a side of the light-guiding component and configured to receive and recognize modulated light emitted from the signal transmitter. A light-emitting surface of the signal transmitter is provided with a light-controlling component. The light-controlling component is configured to adjust a light-emitting angle of the signal transmitter, so that the modulated light emitted from the signal transmitter has a total reflection in the light-guiding component. The display panel further includes a middle frame and an ink layer. The ink layer is disposed between a side of the middle frame facing the light-guiding component and a second surface of the light-guiding component. The second surface is inclined to the first surface.

In a second aspect, a display device is provided by the embodiments of the present disclosure. The display device includes the display panel of the above-mentioned embodiments.

BRIEF DESCRIPTION OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION

Figure 1:
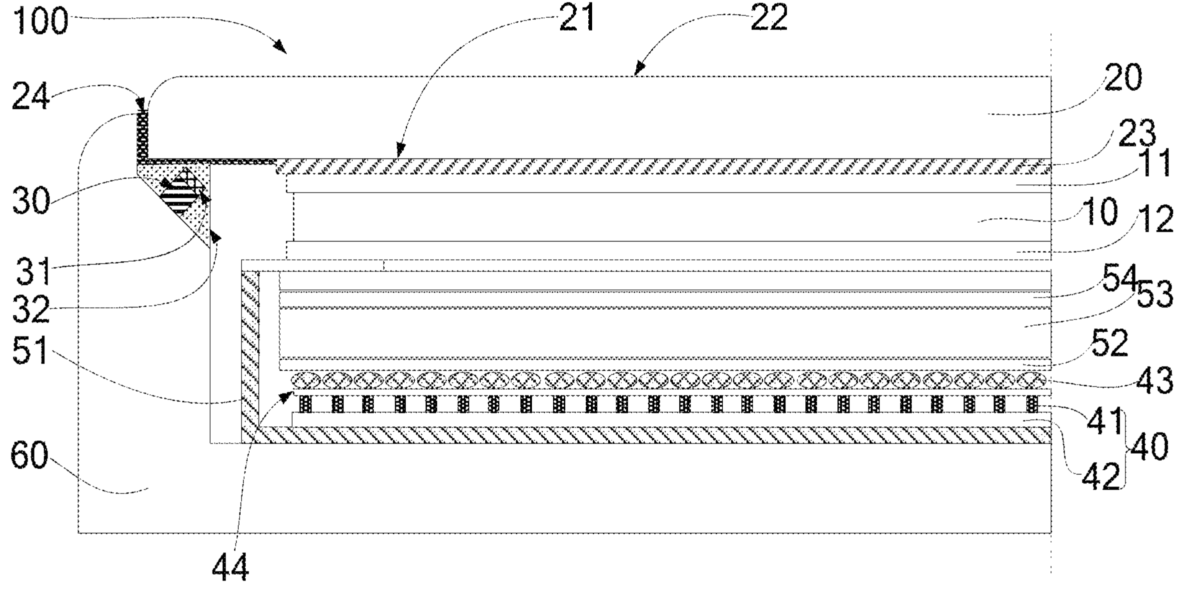
FIG. 1 is a first sectional structural schematic view showing a display panel provided by an embodiment of the present disclosure.

The following description of the various embodiments is provided with reference to the accompanying drawings to demonstrate that the embodiments of the present disclosure may be implemented. The following description of the various embodiments is provided with reference to the accompanying drawings. The embodiments described with reference to the attached drawings are all exemplary and are intended to illustrate and interpret the present disclosure. It should be understood that terms such as “top”, “bottom”, “front”, “rear”, “left”, “right”, “inside”, “outside”, “lateral”, as well as derivatives thereof should be construed to refer to the orientation as then described or as shown in the drawings under discussion. These relative terms are for convenience of description, and shall not be construed as causing limitations to the present disclosure. In the drawings, the identical or similar reference numerals constantly denote the identical or similar elements or elements having the identical or similar functions. In the drawings, the thicknesses of some layers and regions are exaggerated for the purpose of understanding and ease of description. The size and thickness of each component shown in the drawings are arbitrarily shown, but the present disclosure is not limited thereto.

Please refer to FIG. 1, FIG. 1 is a first sectional structural schematic view showing a display panel provided by an embodiment of the present disclosure. A display panel 100 includes a display panel main body 10, a light-guiding component 20, a signal transmitter 30, and a sensor array 40. The light-guiding component 20 is disposed on a light-emitting surface of the display panel main body 10. The signal transmitter 30 is disposed on at least one edge of a first surface of the light-guiding component 20. The first surface of the light-guiding component 20 may be a top surface 22 or a bottom surface 21 of the light-guiding component 20. In an embodiment of the present disclosure, the first surface is the bottom surface 21. A predetermined included angle is defined between the signal transmitter 30 and the bottom surface 21 of light-guiding component 20. The sensor array is disposed on a side of the light-guiding component and is configured to receive and recognize modulated light emitted from the signal transmitter.

Specifically, the sensor array 40 is disposed on a surface of the display panel main body 10 away from the light-guiding component 20 and is configured to receive and recognize modulated light emitted from the signal transmitter 30, thereby realizing functions such as under-display fingerprint recognition. A light-emitting surface of the signal transmitter 30 is provided with a light-controlling component 31 configured to adjust a light-emitting angle of the signal transmitter 30, and the modulated light emitted from the signal transmitter 30 is totally reflected between the top surface and the bottom surface of the light-guiding component 20. Total reflection is interrupted at a position touched by a user’s finger. In the position, light in the light-guiding component 20 is emitted to the sensor array 40 by a light concentrator 43 and is received and recognized by a plurality of light sensors 41 on the sensor array 40. Therefore, under-display fingerprint recognition can be realized in a large area.

The light-guiding component 20 includes a cover plate, other layers of the display panel 100, or other additional components on the display panel 100 which can realize a light-guiding function. In an embodiment of the present disclosure, the guiding component 20 is the cover plate. The top surface 22 of the light-guiding component 20 is a surface of the light-guiding component 20 away from the display panel main body 10. The bottom surface 21 of the light-guiding component 20 is a surface of the light-guiding component 20 toward the display panel main body 10.

The bottom surface 21 of the light-guiding component 20 is further provided with a transparent reflective thin film 23. A refractivity of the transparent reflective thin film 23 is less than a refractivity of the light-guiding component 20. The light-guiding component 20 is made of a material having high refractivity, such as sapphire. The transparent reflective thin film 23 is made of a material having low refractivity, such as transparent silica gel. The transparent reflective thin film 23 does not cover a periphery of the bottom surface 21 of the light-guiding component 20, wherein the periphery of the bottom surface 21 of the light-guiding component 20 corresponds to the signal transmitter 30. Therefore, a region on the light-guiding component 20 covered by the transparent reflective thin film 23 does not overlap with a region of the first surface of the light-guiding component 20 irradiated with light emitted from the signal transmitter 30. An ink layer 24 is disposed at the periphery and corresponds to the signal transmitter 30. A material of the ink layer 24 includes an ink that infrared light is allowed to penetrate, such as HF series inks.

Specifically, the display panel 100 may be an LCD panel. The display panel 100 further includes a backlight module corresponding to the display panel main body 10 and a middle frame 60 configured to contain and fix the light-guiding component 20, the backlight module, and the display panel main body 10. The sensor array 40 is disposed in the backlight module, and the signal transmitter 30 is disposed on the middle frame 60. Of course, the display panel 100 further includes a top polarizer 11 and a bottom polarizer 12 respectively attached to a top surface and a bottom surface of the display panel main body 10. The top polarizer 11 is disposed between the display panel main body 10 and the light-guiding component 20, and the bottom polarizer 12 is disposed between the display panel main body 10 and the backlight module. The display panel main body 10 includes an array substrate, a color filter substrate corresponding to the array substrate, a plurality of liquid crystal molecules disposed between the array substrate and the color filter substrate, and a frame sealant disposed between the array substrate and the color filter substrate. The frame sealant is configured to seal the liquid crystal molecules and make the array substrate and the color filter substrate attached to each other.

An end of the middle frame 60 near the light-guiding component 20 is provided with a recess configured to fix and support the light-guiding component 20. Of course, the light-guiding component 20 can be attached to the recess by adhesive or other ways. The signal transmitter 30 is disposed in an interval between the middle frame 60 and the display panel main body 10 and is disposed on the middle frame 60. The interval between the middle frame 60 and the display panel main body 10 is a space between the middle frame 60 and a lateral edge of the display panel main body 10.

Specifically, the bottom surface 21 of the light-guiding component 20 disposed on the middle frame 60 is provided with a hollow part. The signal transmitter 30 is disposed in the hollow part, and a transparent optically clear adhesive (OCA) 32 is filled in the hollow part to fix the signal transmitter 30. The hollow part is formed by removing part of a bottom portion of the recess of the middle frame 60.

Alternatively, when the middle frame 60 is not provided with the hollow part, the signal transmitter 30 may also be directly disposed on a lateral wall of the middle frame 60 near the light-guiding component 20. The signal transmitter 30 may be disposed on the middle frame 60 by a double-sided tape, an adhesive, or a fixing component disposed on the middle frame 60. Of course, the present disclosure is not limited thereto. In the present disclosure, the signal transmitter 30 may not be disposed on the middle frame 60. For example, the signal transmitter 30 may be directly disposed on the ink layer 24 on the bottom surface 21 of the light-guiding component 20.

Furthermore, please refer to FIG. 1 again. The signal transmitter 30 is disposed in the hollow part of the middle frame 60 by the transparent OCA 32, and a predetermined included angle is defined between the signal transmitter 30 and the bottom surface 21 of the light-guiding component 20. The signal transmitter 30 includes an infrared light-emitting diode (LED) light source configured to emit infrared light. The signal transmitter 30 corresponds to the ink layer 24. Infrared light emitted from the signal transmitter 30 penetrates the ink layer 24 and enters the light-guiding component 20. Infrared light transmittance of the ink layer 24 is relatively high (may be greater than 80%), thereby allowing infrared light emitted from the signal transmitter 30 to penetrate the ink layer 24 and enter the light-guiding component 20 as much as possible. Invisible light transmittance of the ink that infrared light is allowed to penetrate is relatively low, thereby preventing visible light emitted from the backlight module from leaking from the interval between the middle frame 60 and the display panel main body 10.

Figure 2:
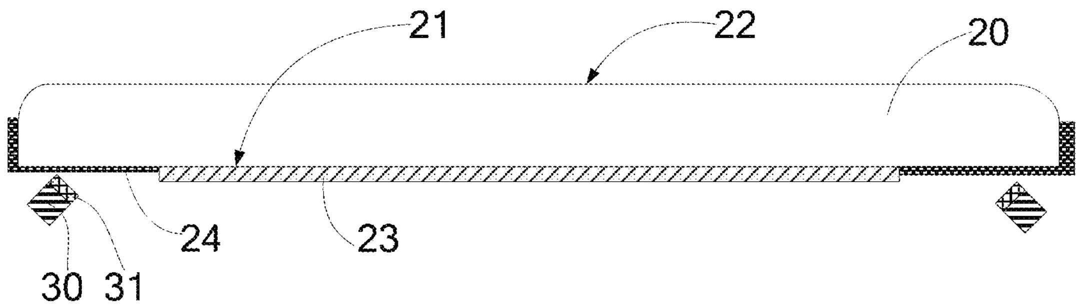
FIG. 2 is a schematic view showing a position where a signal transmitter provided by the embodiment of the present disclosure is disposed.

Please refer to FIG. 1 and FIG. 2. FIG. 2 is a schematic view showing a position where the signal transmitter provided by the embodiment of the present disclosure is disposed. The signal transmitter 30 may be disposed on a lateral edge of the bottom surface 21 of the light-guiding component 20, but is not limited thereto. The signal transmitter 30 may also be simultaneously disposed on two corresponding lateral sides of the bottom surface 21 of the light-guiding component 20. The two corresponding lateral sides of the bottom surface are provided with the ink layer 24, as shown in FIG. 2.

Figure 3:
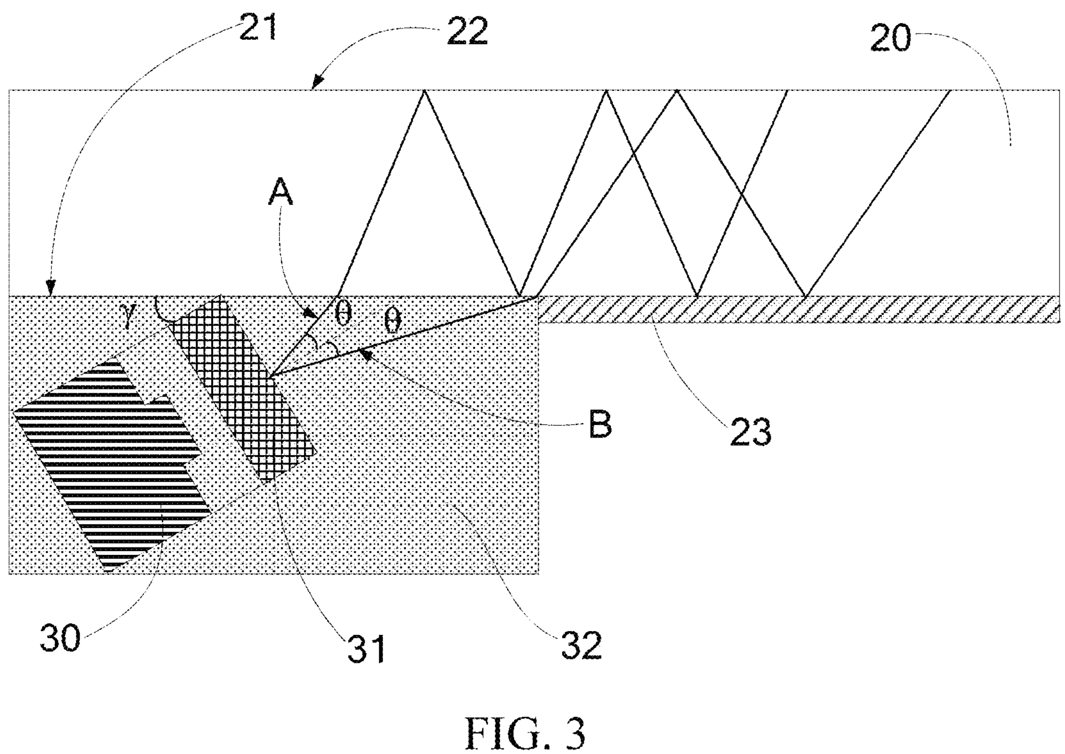
FIG. 3 is a schematic view showing an optical path of light emitted by the signal transmitter provided by the embodiment of the present disclosure.

Please refer to FIG. 1 and FIG. 3. FIG. 3 is a schematic view showing an optical path of light emitted by the signal transmitter provided by the embodiment of the present disclosure. A light-controlling component 31 is disposed on the signal transmitter 30 and includes a first collimator. The first collimator is disposed on a light-emitting surface of the signal transmitter 30 by the transparent OCA 32. Furthermore, the first collimator is provided with a first opening, thereby converging light emitted from the signal transmitter 30 and further adjusting a light-emitting angle θ of the signal transmitter 30. The light-emitting angle θ satisfies a following formula:

$$\theta \leq 90^\circ - \gamma - \text{arc}\sin\left(\frac{n_3}{n_4}\right); \theta < \gamma + \arcsin\left(\frac{n_2}{n_4}\right) - 90^\circ.$$

Wherein, n2 denotes a refractivity of a user's finger, n3 denotes a refractivity of the transparent reflective thin film 23, n4 denotes a refractivity of the transparent OCA 32, γ denotes a predetermined included angle between the signal transmitter 30 and the bottom surface 21 of the light-sensing component 20, and 0°<γ<90°. When the signal transmitter 30 is disposed at the predetermined included angle γ, a range of the light-emitting angle θ an be obtained according to the above formula. Of course, the light-emitting angle θ needs to be greater than 0°. Then, the light-emitting angle is adjusted to be within an appropriate range by the first collimator, wherein the appropriate range of the light-emitting angle θ is obtained according to the above formula. It should be noted that FIG. 3 is only a schematic view showing a light path of light emitted from the signal transmitter 30, and some details of a structure, such as the ink layer on the periphery of the bottom surface 21 of the light-guiding component 20 and the first opening of the first collimator, are not shown completely and are not described here.

Please refer to FIG. 3 again. FIG. 3 shows two boundary rays emitted at the light-emitting angle θ formed from modulated light emitted from the signal transmitter 30 penetrating the light-controlling component 31. Specifically, in a region irradiated with light emitted from the light-controlling component as shown in FIG. 3, light emitted from the signal transmitter 30 to the light-controlling component 31 is concentrated between the two boundary rays. It should be understood that a situation of light emitted from the signal transmitter 30 to other regions of the light-controlling component 31 is same as a situation of light emitted from the light-controlling component to the irradiated region as shown in FIG. 3. The two boundary rays include a top boundary ray A and a bottom boundary ray B. The top boundary ray A is totally reflected by the top surface 22 of the light-guiding component 20 after entering the light-guiding component 20. Meanwhile, an incident angle of the top boundary ray A reflected by the top surface 22 of the light-guiding component 20 is a critical angle at which total reflection occurs. The bottom boundary ray B is totally reflected by the bottom surface 21 of the light-guiding component 20 after entering the light-guiding component 20. Meanwhile, an incident angle of the bottom boundary ray B reflected by the bottom surface 21 of the light-guiding component 20 is a critical angle at which total reflection occurs. As a result, all light within the light-emitting angle θ is totally reflected by the top surface 22 or the bottom surface 21 of the light-guiding component 20.

It should be noted that modulated light emitted from the signal transmitter 30 is totally reflected by the bottom surface 21 of the light-guiding component 20. This means that after the modulated light enters the light-guiding component 20, the modulated light reflected by the top surface 22 of the light-guiding component 20 is totally reflected by the bottom surface 21.

It should be understood an incident angle of the top boundary ray A totally reflected by the top surface 22 of the light-guiding component 20 and an incident angle of the bottom boundary ray B totally reflected by the bottom surface 21 of the light-guiding component may not be a critical angle. Meanwhile, all light within the light-emitting angle θ may also be totally reflected by the top surface 22 or the bottom surface 21 of the light-guiding component 20. In addition, when a refractivity of the transparent reflective thin film 23 is near a refractivity of air, a critical angle at which total reflection occurs on the top surface 22 of the light-guiding component 20 is also near a critical angle at which total reflection occurs on the bottom surface 21 of the light-guiding component 20. Meanwhile, light utilization efficiency of the signal transmitter 30 is increased.

Because infrared light emitted from the signal transmitter 30 at the certain light-emitting angle θ can be totally reflected by the top surface 22 or the bottom surface 21 of the light-guiding component 20, the top surface 22 of the light-guiding component 20 is always irradiated with light. When a user's finger touches any position of the top surface 22 of the light-guiding component 20, total reflection at the position will be interrupted. Meanwhile, light at the position is emitted from the bottom surface 21 of the light-guiding component 20, penetrates the display panel main body 10, and reaches a corresponding light sensor 41 on the sensor array 40.

Specifically, please refer to FIG. 1 again. The sensor array 40 is disposed on a bottom side of the backlight module. Therefore, light emitted from the light-guiding component 20 needs to further penetrate an optical film on the backlight module after penetrating the display panel main body 10. The backlight module includes a backplate 51, a reflective film 52, and a light-guiding plate 53. The sensor array 40 is disposed on the backplate 51. A containing cavity is formed on the backplate 51 and is configured to contain the sensor array 40, the reflective film 52, and the light-guiding plate 53. Wherein, the reflective film 52 is disposed above the sensor array 40, and the light-guiding plate 53 is disposed above the reflective film 52. Of course, the backlight module further includes optical films, such as a backlight source disposed on a side of the light-guiding plate 53, a diffusion plate 54 disposed above the light-guiding plate 53, and a brightening film, which are not described here in detail.

It should be noted that infrared light should be allowed to penetrate the backlight module. Infrared light emitted from the light-guiding component 20 should be allowed to penetrate the optical films on the backlight module as much as possible to reach a corresponding light sensor 41 on the sensor array 40. For example, the backlight module may include optical films, such as the reflective film 52, the diffusion plate 54, and the brightening film, which can be penetrated by infrared light, thereby improving infrared light transmittance of the backlight module.

The sensor array 40 includes the plurality of light sensors 41 arranged in an array manner and a substrate 42 configured to fix the light sensors 41. A plurality of driving circuits are disposed on the substrate 42. A light concentrator 43 is disposed on a side of the sensor array 40 toward the display panel main body 10 and is configured to accumulate modulated light in a fingerprint period, thereby allowing a corresponding light sensor 41 to receive and recognize the modulated light. Specifically, the light concentrator 43 is disposed between the sensor array 40 and the reflective film 52. The light concentrator 43 can accumulate infrared light penetrating the optical films of the backlight module, thereby allowing more infrared light to reach the light sensors 41.

Figure 4:
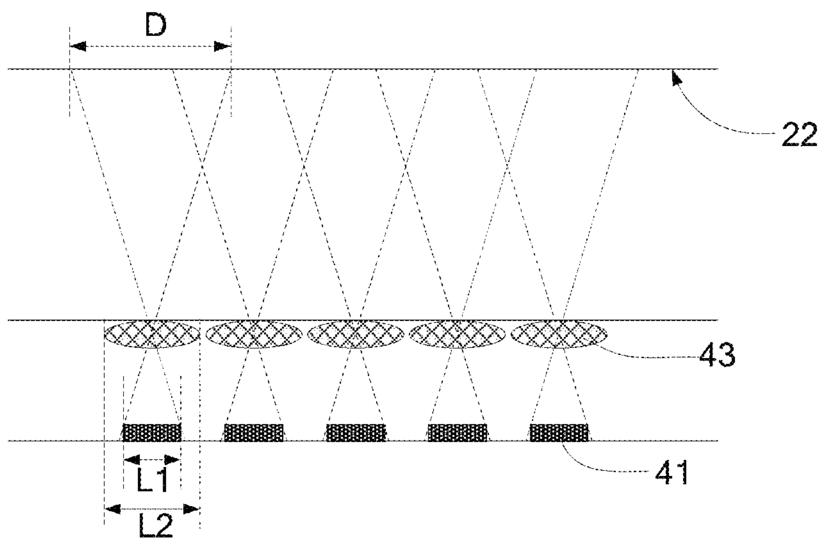
FIG. 4 is a schematic view showing a light concentration principle of a light concentrator provided by the embodiment of the present disclosure, wherein the light concentrator is a microlens.

Please refer to FIGS. 1 to 4. FIG. 4 is a schematic view showing a light concentration principle of the light concentrator provided by the embodiment of the present disclosure, wherein the light concentrator is a micro lens. The light concentrator 43 includes a plurality of microlenses corresponding to the light sensors 41, and a size L2 of the microlenses is greater than a size L1 of the light sensors 41. A viewing range D of each of the microlenses on the top surface 22 of the light-guiding component is less than or equal to a fingerprint period. In the viewing range D, all light can reach the light sensors 41 corresponding to the microlenses after penetrating the microlenses. The fingerprint period is a length from a valley to a ridge of a fingerprint.

Furthermore, a light filter 44 is further disposed between the sensor array 40 and the light concentrator 43. The light filter 44 can be penetrated by light having predetermined wavelengths and can filter out light having other wavelengths. For example, in the present disclosure, the light filter 44 can be penetrated by infrared light, thereby preventing the light sensors 41 from being affected by light having other wavelengths and improving a successful rate of fingerprint recognition. Therefore, the light filter 44 may be a color filter that can only be penetrated by light with predetermined wavelengths.

The light sensors 41 include at least one of an organic photoelectric detection sensor, a quantum dot sensor, or a silicon-based sensor.

Figure 5:
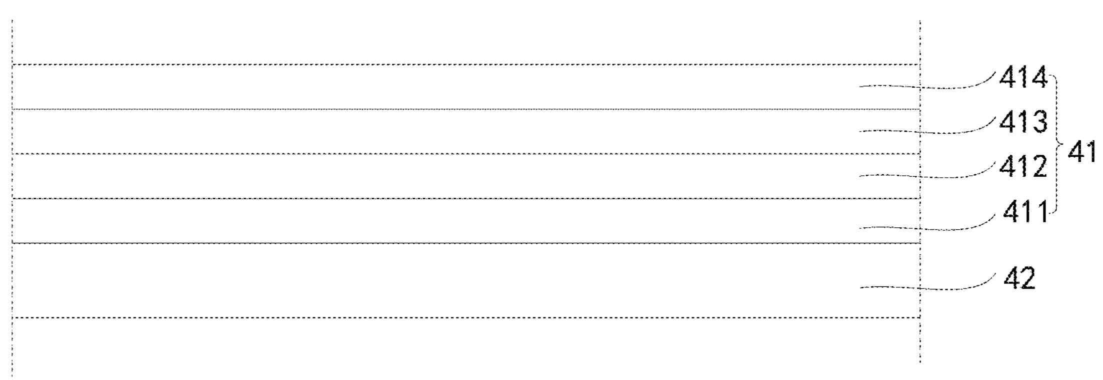
FIGS. 5 to 7 are sectional schematic views showing layers of a light-guiding component provided by the embodiment of the present disclosure.
Figure 6:
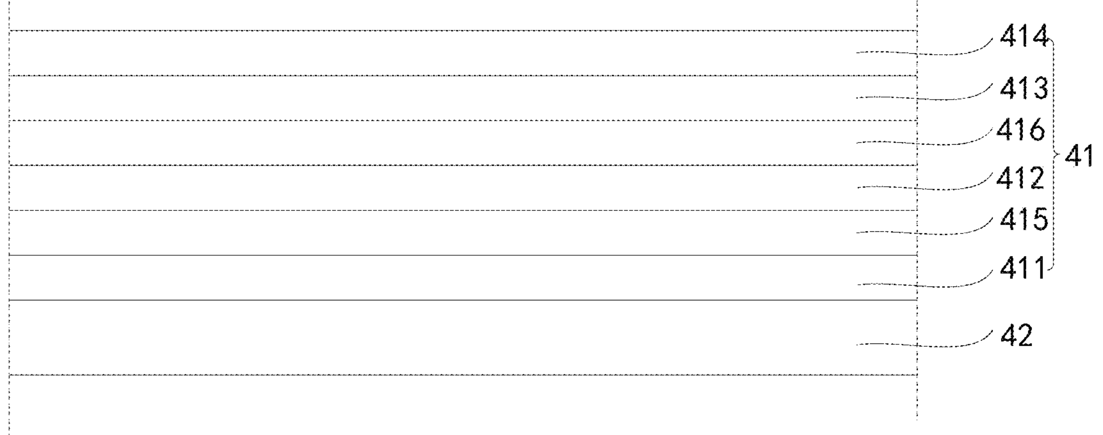
Figure 7:

Specifically, please refer to FIGS. 5 to 7. FIGS. 5 to 7 are sectional schematic views showing layers of a light-guiding component provided by the embodiment of the present disclosure. When the light sensors 41 are the organic photoelectric detection sensors, a stacked-layer structure thereof is as shown in FIG. 5. A first electrode 411, a light-sensing layer 412, a second electrode 413, and a protective layer 414 are sequentially stacked on the substrate 42. The substrate 42 includes a thin-film transistor (TFT) driving circuit formed on a polyimide substrate or a glass substrate. The first electrode 411 may be a cathode. The second electrode 413 may be an anode. The light-sensing layer 412 may generate a current when being irradiated with light, thereby converting photons into electrons.

When the light sensors 41 are quantum dot sensors, a stacked-layer structure thereof is as shown in FIG. 6. The first electrode 411, an electron transport layer 415, the light-sensing layer 412, a hole transport layer 416, the second electrode 413, and the protective layer 414 are sequentially stacked on the substrate 42. Compared with the organic photoelectric detection sensors, the quantum dot sensors are further provided with the electron transport layer 415 and the hole transport layer 416. Furthermore, a material of the light-sensing layer 412 is a mercury-free colloidal quantum dot such as a lead sulfide quantum dot (PbS CQD).

When the light sensors 41 are silicon-based sensors, a stacked-layer structure thereof is as shown in FIG. 7. A light-shielding layer 417, a polysilicon layer 418, an amorphous silicon layer 419, the second electrode 413, and the protective layer 414 are sequentially stacked on the substrate 42. Compared with the organic photoelectric detection sensors, the silicon-based sensors do not need to include the first electrode. An electrode in the TFT driving circuit on the substrate 42 can be used as a cathode, and the amorphous silicon layer 419 can be used as a light-sensing layer.

To ensure that the light sensors 41 can effectively conduct fingerprint recognition, the light sensors 41 should have high conversion efficiency of external quantum dots and relatively small dark current density, and should be patternable. Wherein, the conversion efficiency of external quantum dots is a number of photons or electrons generated during irradiation, and the dark current density is a density of current generated without irradiation. For example, when the organic photoelectric detection sensor is tested by being irradiated with light having a voltage of −2V and a wavelength of 940 nm, the conversion efficiency of external quantum dots should be greater than 80%. When the organic photoelectric detection sensor is tested without irradiation, the dark current density is 2*10−8A/cm2. Furthermore, the organic photoelectric detection sensors can be patterned by lithography, thereby forming a desired pattern and a desired size.

In the present embodiment, the predetermined included angle γ is defined between the signal transmitter 30 and the light-guiding component 20, and the light-controlling component 31 is disposed on the signal transmitter 30. The light-controlling component 31 may converge light emitted from the signal transmitter 30, thereby allowing light emitted from the signal transmitter 30 to be emitted to the light-guiding component 20 at the light-emitting angle θ. Then, total reflection occurs on the top surface 22 and the bottom surface 21 of the light-guiding component 20. When a user's finger touches any position on the top surface 22 of the light-guiding component 20, a medium is changed from air to the user's finger. Therefore, a refractivity is changed, and total reflection at a touching position is interrupted. Infrared light having fingerprint signals is emitted from the bottom surface 21 of the light-guiding component 20, and then is received and recognized by a corresponding light sensor 41 after being accumulated by the light contractor 43, thereby realizing under-display fingerprint recognition in a large area.

Figure 8:
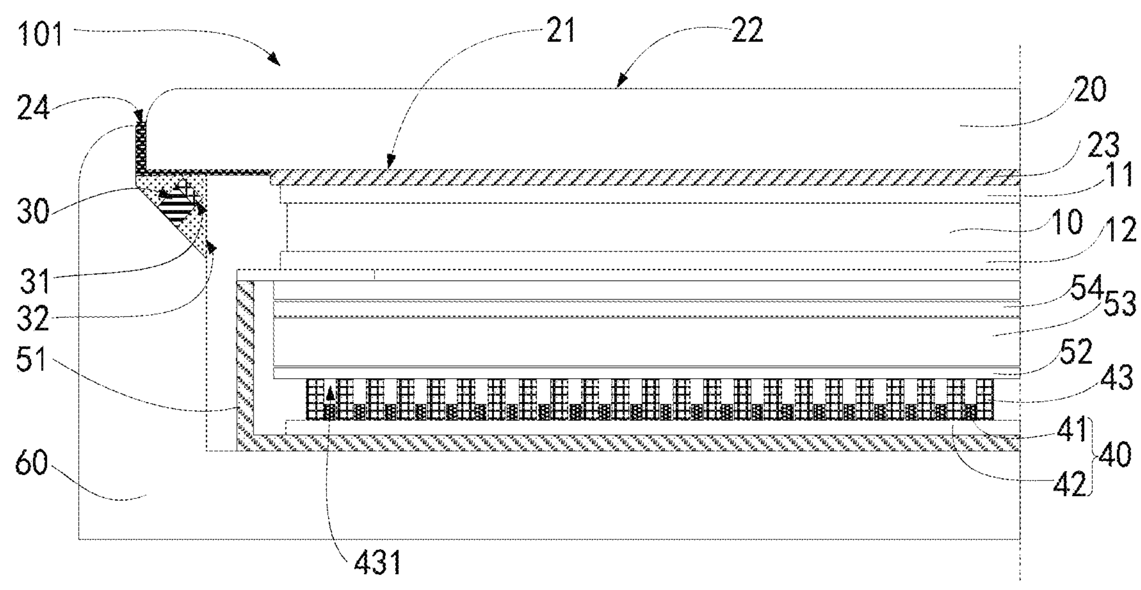
FIG. 8 is a second sectional structural schematic view showing a display panel provided by an embodiment of the present disclosure.
Figure 9:
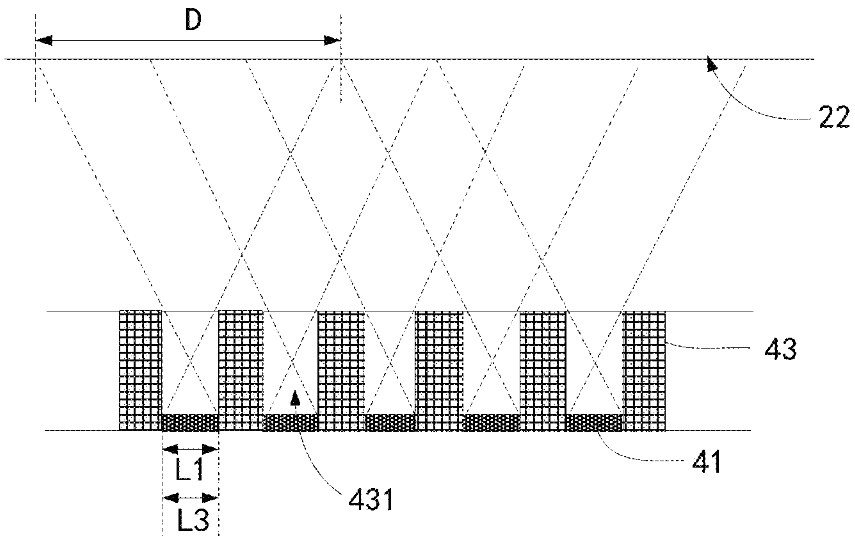
FIG. 9 is a schematic view showing a light concentration principle of a light concentrator provided by the embodiment of the present disclosure, wherein the light concentrator is a collimator.

Please refer to FIGS. 8 to 9. FIG. 8 is a second sectional structural schematic view showing a display panel provided by an embodiment of the present disclosure. FIG. 9 is a schematic view showing a light concentration principle of a light concentrator provided by the embodiment of the present disclosure, wherein the light concentrator is a collimator. Differences between a display panel 101 of the present embodiment and the display panel 100 of the above-mentioned embodiments are: in the present embodiment, the light concentrator 43 includes a second collimator provided with a plurality of second openings 431. The second openings 431 correspond to the light sensors 41, and a size L3 of the second openings 431 is equal to the size L1 of the light sensors 41. Each of the second openings 431 on the second collimator is like a micro-opening blocking plate. The viewing range D of each of the micro-opening blocking plates on the top surface 22 of the light-guiding component 20 is ls less than or equal to the fingerprint period.

In the present embodiment, to prevent light sensors 41 from being interfered with by light having other wavelengths and to increase a successful rate of fingerprint recognition, the light filter (not shown) can be disposed between the sensor array 40 and the light concentrator 43. The light filter can be penetrated by light having predetermined wavelengths and can filter out light having other wavelengths. Other features can be referred to the above-mentioned embodiments and are not described again here.

Figure 10:
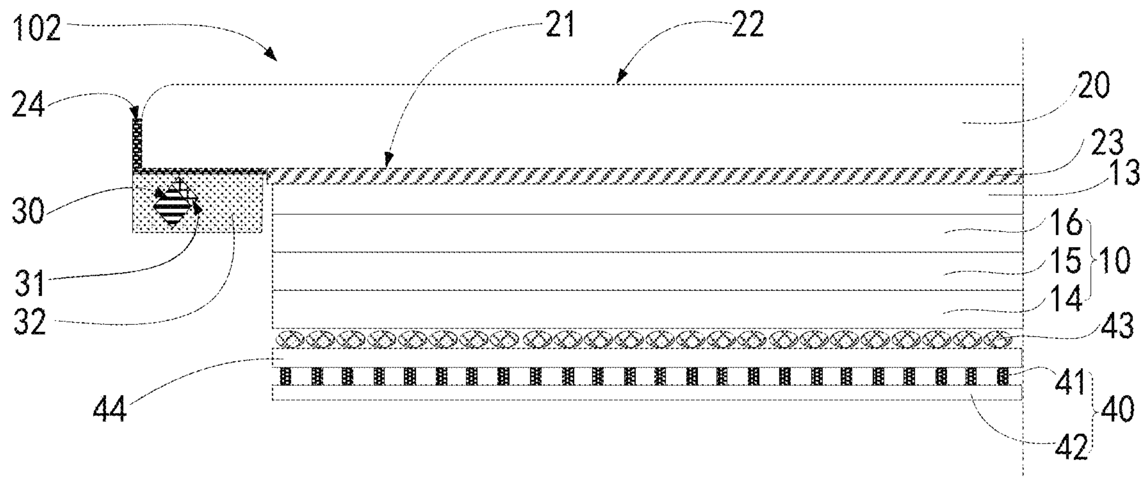
FIG. 10 is a third sectional structural schematic view showing a display panel provided by an embodiment of the present disclosure.

Please refer to FIG. 10. FIG. 10 is a third sectional structural schematic view showing a display panel provided by an embodiment of the present disclosure. Differences between the present embodiment and the above-mentioned embodiments are: in the present embodiment, the display panel main body 10 of a display panel 102 is an organic light-emitting diode (OLED) display panel main body, and the sensor array 40 is directly disposed below the display panel main body 10. The differences between the display panel 102 of the present embodiment and the display panel 100 of the above-mentioned embodiment are described in detail below, and same structures and functions are not described again.

The display panel 102 includes the display panel main body 10, a polarizer 13 disposed on the light-emitting surface of the display panel main body 10, and the light-guiding component 20 disposed above the polarizer 13. The display panel main body 10 may include a driving circuit layer 14, a luminescent functional layer 15, and an encapsulation layer 16, which are disposed on the substrate.

The signal transmitter 30 is directly disposed at a lateral edge of the bottom surface 21 of the light-guiding component 20 by the transparent OCA 32. A predetermined included angle is defined between the signal transmitter 30 and the bottom surface 21 of the light-guiding component 20. Light emitted from the signal transmitter 30 is emitted to the light-guiding component 20 at a certain light-emitting angle after penetrating the light-controlling component 31. Then, the light is totally reflected by the top surface 22 or the bottom surface 21 of the light-guiding component 20. When a user's finger touches any position on the top surface 22 of the light-guiding component 20, a medium is changed from air to the user's finger. Therefore, a refractivity is changed, and total reflection at a touching position is interrupted. Infrared light having fingerprint signals is emitted from the bottom surface 21 of the light-guiding component 20, and then is received and recognized by a corresponding light sensor 41 after being accumulated by the light contractor 43, thereby realizing under-display fingerprint recognition in a large area. The light concentrator 43 is a micro lens.

Figure 11:
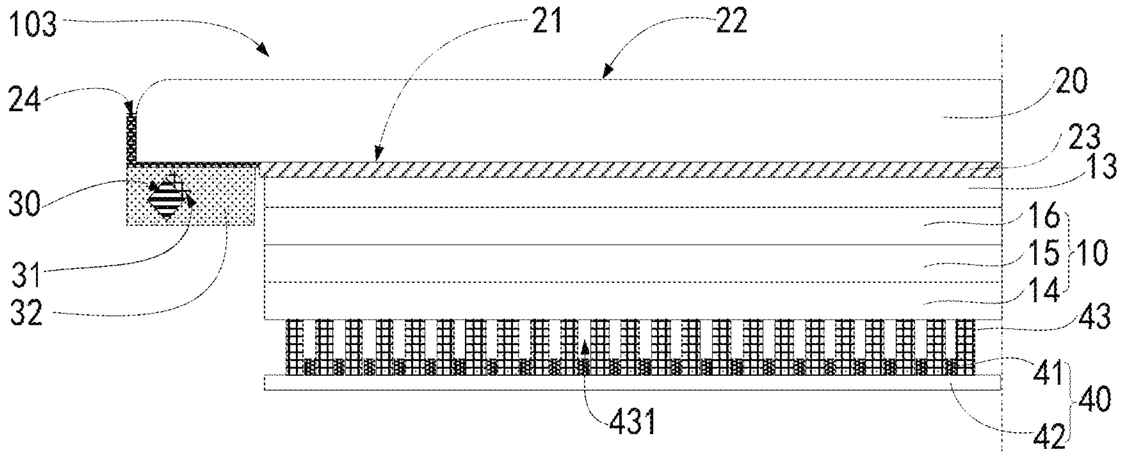
FIG. 11 is a fourth sectional structural schematic view showing a display panel provided by an embodiment of the present disclosure.

Please refer to FIG. 11. FIG. 11 is a fourth sectional structural schematic view showing a display panel provided by an embodiment of the present disclosure. Differences between the present embodiment and the display panel 102 of the above-mentioned embodiments are: in the present embodiment, the light concentrator 43 is the second collimator provided with the plurality of second openings 431. The second openings 431 correspond to the light sensors 41, and a size of the second openings 431 is equal to a size of the light sensors 41. Other features can be referred to the above-mentioned embodiments and are not described again here.

The present disclosure further provides one embodiment, and differences between the present embodiment and the above-mentioned embodiments are: in the present embodiment, the light sensor array may be disposed between the light-guiding component and the display panel main body. That is, the light sensor array is disposed above the display panel main body. Other features can be referred to the above-mentioned embodiments and are not described again here.

An embodiment of the present disclosure further provides a display device, including any one of the display panels of the above-mentioned embodiments.

According to the above embodiments, the present disclosure provides a display panel and a display device. The display panel includes a display panel main body, a light-guiding component, a signal transmitter, and a sensor array. The light-guiding component is disposed on a light-emitting surface of the display panel main body. The signal transmitter is disposed on at least one edge of a first surface of the light-guiding component, and a predetermined included angle is defined between the signal transmitter and the first surface of the light-guiding component. The sensor array is disposed on a surface of the display panel main body away from the light-guiding component and is configured to receive and recognize modulated light emitted from the signal transmitter. Wherein, a light-controlling component is disposed on a light-emitting surface of the signal transmitter. The light-controlling component is configured to adjust a light-emitting angle of the signal transmitter, thereby allowing modulated light emitted from the signal transmitter to be totally reflected between a top surface and a bottom surface of the light-guiding component. Total reflection is interrupted at a position touched by a user's finger. In the position, light in the light-guiding component is emitted to the sensor array by a light concentrator and is received and recognized by a plurality of light sensors on the sensor array. Therefore, under-display fingerprint recognition can be realized in a large area. The light concentrator on the sensor array can accumulate light, so that more light can be received and recognized by the light sensors. Therefore, sensitivity of fingerprint recognition is improved. Furthermore, both the light concentrator and the fingerprint sensor array can be disposed below the main body of the display panel. Thus, compared with conventional large-scale display panels formed by collage, the display panel provided by the present disclosure has lower costs and a lighter and thinner body. Moreover, a display function of the display panel provided by the present disclosure would not be affected.

In summary, the present disclosure has been described with preferred embodiments thereof. The preferred embodiments are not intended to limit the present disclosure, and it is understood that many changes and modifications to the described embodiments can be carried out without departing from the scope and the spirit of the disclosure that is intended to be limited only by the appended claims.

What is claimed is:

1. A display panel, comprising:

a light-guiding component;

a signal transmitter disposed on at least one edge of a first surface of the light-guiding component, wherein a predetermined included angle is defined between the signal transmitter and the first surface of the light-guiding component; and a sensor array disposed on a side of the light-guiding component and configured to receive and recognize modulated light emitted from the signal transmitter;

wherein a light-emitting surface of the signal transmitter is provided with a light-controlling component, the light-controlling component is configured to adjust a light-emitting angle of the signal transmitter, so that the modulated light emitted from the signal transmitter has a total reflection in the light-guiding component; and wherein the display panel further comprises a middle frame and an ink layer, and the ink layer is disposed between a side of the middle frame facing the light-guiding component and a second surface of the light-guiding component, and the second surface is inclined to the first surface.

2. The display panel according to claim 1, wherein the ink layer is disposed on a periphery of the first surface of the light-guiding component, and the ink layer is disposed corresponding to the signal transmitter.

3. The display panel according to claim 2, wherein the ink layer is provided on two corresponding lateral sides of the first surface.

4. The display panel according to claim 2, wherein the signal transmitter is disposed on the ink layer located on the first surface of the light-guiding component.

5. The display panel according to claim 1, wherein a material of the ink layer comprises an ink that infrared light is allowed to penetrate, and an infrared light transmittance of the ink layer is greater than 80%.

6. The display panel according to claim 1, wherein the light-controlling component comprises a first collimator, and the first collimator is disposed on the light-emitting surface of the signal transmitter by a transparent optically clear adhesive.

7. The display panel according to claim 6, wherein the first collimator is provided with a first opening configured to converge the light-emitting angle of the signal transmitter.

8. The display panel according to claim 1, further comprising a transparent reflective thin film disposed between the light-guiding component and the sensor array, wherein a refractivity of the transparent reflective thin film is less than a refractivity of the light-guiding component.

9. The display panel according to claim 8, wherein a region on the light-guiding component covered by the transparent reflective thin film does not overlap with a region of the first surface of the light-guiding component irradiated with light emitted from the signal transmitter.

10. The display panel according to claim 8, wherein the transparent reflective thin film comprises a transparent silica gel.

11. The display panel according to claim 1, wherein the sensor array comprises a plurality of light sensors arranged in an array manner, and a light concentrator is disposed on a side of the sensor array toward the light-guiding component.

12. The display panel according to claim 11, wherein the light concentrator is configured to accumulate the modulated light in a fingerprint period, and a corresponding light sensor receives and recognizes the modulated light.

13. The display panel according to claim 11, wherein the light concentrator comprises a plurality of microlenses corresponding to the plurality of light sensors, and a size of each of the plurality of microlenses is greater than a size of a corresponding one of the plurality of light sensors.

14. The display panel according to claim 11, wherein the light concentrator comprises a second collimator, the second collimator is provided with a plurality of second openings, the plurality of second openings correspond to the plurality of light sensors, and a size of each of the plurality of second openings is equal to a size of a corresponding one of the plurality of light sensors.

15. The display panel according to claim 11, wherein a light filter is further disposed between the sensor array and the light concentrator and is configured to allow light having predetermined wavelengths to penetrate.

16. The display panel according to claim 15, wherein the light filter comprises a color filter.

17. The display panel according to claim 1, wherein the signal transmitter is fixed on the middle frame.

18. The display panel according to claim 17, wherein an end of the middle frame near the light-guiding component is provided with a recess configured to fix and support the light-guiding component, and an orthographic projection of the signal transmitter on the light-guiding component is located in an orthographic projection of the recess on the light-guiding component.

19. The display panel according to claim 17, wherein a hollow part is provided on the middle frame at a position near the first surface of the light-guiding component, the signal transmitter is disposed in the hollow part, and a transparent optically clear adhesive is filled in the hollow part to fix the signal transmitter.

20. A display device, comprising a display panel, wherein the display panel comprises:

a light-guiding component;

a signal transmitter disposed on at least one edge of a first surface of the light-guiding component, wherein a predetermined included angle is defined between the signal transmitter and the first surface of the light-guiding component; and a sensor array disposed on a side of the light-guiding component and configured to receive and recognize modulated light emitted from the signal transmitter;

wherein a light-emitting surface of the signal transmitter is provided with a light-controlling component, the light-controlling component is configured to adjust a light-emitting angle of the signal transmitter, so that the modulated light emitted from the signal transmitter has a total reflection in the light-guiding component; and wherein the display panel further comprises a middle frame and an ink layer, and the ink layer is disposed between a side of the middle frame facing the light-guiding component and a second surface of the light-guiding component, and the second surface is inclined to the first surface.

* * * * *